United States Patent [19]
Charles et al.

[11] Patent Number: 5,943,472
[45] Date of Patent: Aug. 24, 1999

[54] DEVICE FOR PRODUCING HOT WATER OR STEAM ON DEMAND USING A SINGLE DISTRIBUTION CONTROL MEMBER

[75] Inventors: Patrick Charles, Lavay; Maurjee Teule; Alexandre Roughes, both of Tarbes, all of France

[73] Assignee: SEB S.A., Ecully, France

[21] Appl. No.: 08/765,077

[22] PCT Filed: Jun. 16, 1995

[86] PCT No.: PCT/FR95/00795

§ 371 Date: Dec. 20, 1996

§ 102(e) Date: Dec. 20, 1996

[87] PCT Pub. No.: WO95/35057

PCT Pub. Date: Dec. 28, 1995

[30] Foreign Application Priority Data

Jun. 20, 1994 [FR] France ................................. 94 07748

[51] Int. Cl.$^6$ ............................. F22B 29/06; A23F 1/22
[52] U.S. Cl. ...................... 392/396; 392/480; 219/401; 99/280
[58] Field of Search ........................... 219/401; 392/396, 392/397, 480, 472, 391, 469, 470, 481, 484; 99/280, 304

[56] References Cited

U.S. PATENT DOCUMENTS

| | | | |
|---|---|---|---|
| 3,795,788 | 3/1974 | Perucca | 392/484 |
| 3,902,408 | 9/1975 | Fuhner | |
| 4,121,508 | 10/1978 | Hartkorn | 99/283 |
| 4,242,568 | 12/1980 | Wunderlin et al. | 392/397 |
| 4,262,585 | 4/1981 | Leuschner et al. | 99/280 |
| 4,426,920 | 1/1984 | Phillips et al. | 99/307 |
| 4,516,011 | 5/1985 | Jeffress | 219/401 |
| 4,715,998 | 12/1987 | Clow | 392/396 |
| 4,827,837 | 5/1989 | Johnson et al. | 99/280 |
| 5,150,448 | 9/1992 | Salomon | 392/397 |
| 5,271,087 | 12/1993 | Schmid | 392/485 |
| 5,379,682 | 1/1995 | Andrew et al. | 99/281 |

FOREIGN PATENT DOCUMENTS

| | | |
|---|---|---|
| 0 162 958 | 12/1985 | European Pat. Off. . |
| 0 432 460 | 6/1991 | European Pat. Off. . |
| 2 588 739 | 4/1987 | France . |
| 2 685 187 | 6/1993 | France . |
| 2 258 897 | 6/1974 | Germany . |
| 86 18 149 | 9/1986 | Germany . |
| 38 40 102 | 5/1990 | Germany . |
| 7 505 052 | 11/1976 | Netherlands . |
| 8 101 610 | 11/1982 | Netherlands . |

Primary Examiner—Teresa Walberg
Assistant Examiner—Thor Campbell
Attorney, Agent, or Firm—Pillsbury Madison & Sutro

[57] ABSTRACT

The present invention concerns steam generators and a heating unit consisting of a tube (21) for circulating water in a connecting column (3) arranged below a reservoir (1). The heating unit is characterized by having two parts (A, B) each including a portion of the circulating tube (21) to form two heating areas, the first part (A) being slightly angled and extending downwards from the connecting column (3) in the direction of the water flow, the second part (B) extending upwards to convey water to the dispensing member (10). Application to coffee machine boilers.

17 Claims, 3 Drawing Sheets

5,943,472

DEVICE FOR PRODUCING HOT WATER OR STEAM ON DEMAND USING A SINGLE DISTRIBUTION CONTROL MEMBER

BACKGROUND OF THE INVENTION

The present invention relates to the field of appliances intended to furnish hot water and/or steam for different operations such as the preparation of hot beverages, cleaning, pressing or cooking. The invention concerns more particularly the structure and operation of a water heater or heating unit, arranged for example, in a coffee maker of the filter of espresso type. Other appliances such as steam generators, pressing irons or steam cookers are equally concerned and do not fall outside of the framework of the present invention.

It is already known, and particularly from the document EP-A-0432460 to make water heaters, for hot beverage machines, in a particular form, in order to transfer and heat the water with an improved efficiency. The water heater described in this prior art document comprises a heating element in thermal communication with a water circulation pipe. The heating element and the pipe have a form substantially in a U with vertical inlet and outlet portions and an intermediate portion which is slightly inclined and rises relative to the horizontal in the direction of water circulation. In addition, the heating element comprises four heating zones which are differentiated and distributed along the water circulation pipe. Such a conception permits in particular evacuation toward the outlet portion of vapor bubbles while preventing their return toward the inlet portion of the pipe.

The drawbacks of a water heater such as described in the document EP-A-0432460 is on the one hand the impossibility of utilizing said water heater to produce hot water or vapor as desired by the user and on the other hand a complexity of fabrication or production which increases its cost.

BRIEF SUMMARY OF THE INVENTION

The object of the present invention is to produce a water heater free of the drawbacks of the prior art and permitting an increase in performance as much with respect to the temperature obtained for the hot water as with respect to the speed of preparation of beverages or of production of steam. Such a heating unit equally has for its object to increase the duration of the presence of a large part of the water in a water heater, in a manner to optimize the temperature of all of the hot water distributed.

Another object of the present invention is to furnish a heating unit permitting the distribution of hot water or steam as desired by the user.

A supplemental object of the present invention is to produce a heating unit permitting the distribution of either hot water or steam with a limited number of parts and thus to reduce the cost of such a device.

The objects assigned to the invention are achieved with the aid of a heating unit for a household appliance constituted by a water circulation pipe in thermal communication with a heating element, permitting transfer of water contained in a reservoir toward a distribution member, and through respectively a connection column disposed below the reservoir and the circulation pipe presenting a configuration in two parts associated with a portion of a heating element, the second part extending upwardly to bring the water toward the distribution member, characterized in that the first part, oriented at an angle with respect to the second part, extends between the connection column furnished with a non-return valve and said second part, in an inclined manner and descending in the direction of flow of the water.

BRIEF DESCRIPTION OF THE SEVERAL VIEWS OF THE DRAWING

The characteristics and advantages of the invention will become more readily apparent from a reading of the description given below with reference to the attached drawings given by way of non-limiting example in which.

DETAILED DESCRIPTION OF THE INVENTION

Figure 1:
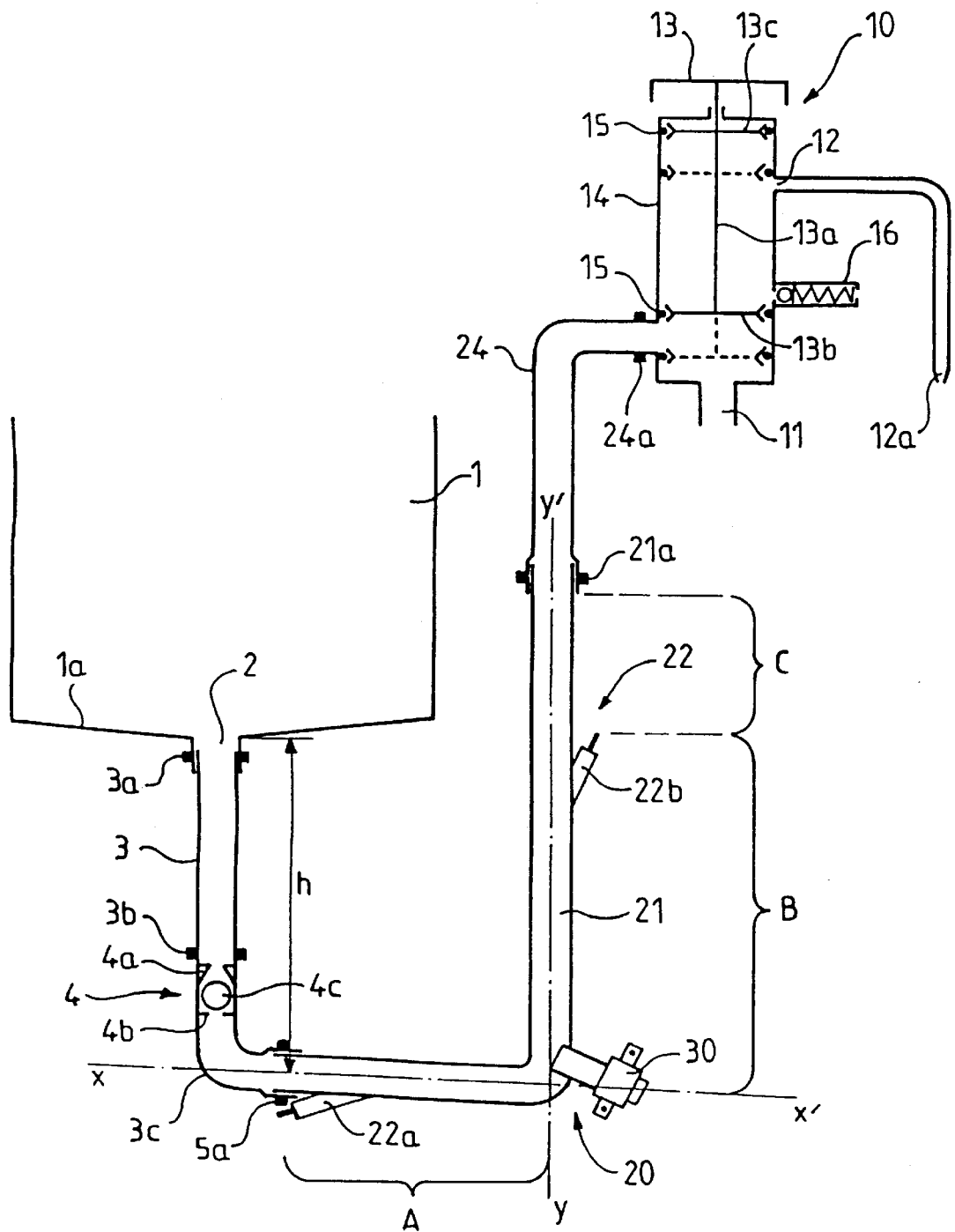
FIG. 1 represents an overall view in cross-section of a heating unit according to the invention.

FIG. 1 represents an overall view in cross-section of the heating unit according to the invention, and permits at the same time visualization of the operation of said heating unit. The heating unit comprises a reservoir 1, a distribution member 10, a water heater 20 as well as means for connecting together the different elements. Reservoir 1 for storing water is arranged, fixed or housed by any means at the interior of the appliance for preparation of hot beverages for example.

Reservoir 1 comprises a bottom 1a in which is arranged an opening 2 to evacuate water stored in said reservoir 1, during operation of the heating unit. Opening 2 opens into a connection column 3 in which is arranged a non-return valve 4. Connection column 3 presents a tubular form with an internal diameter preferably of around 10 millimeters. Connection column 3 is also in communication with the water heater 20.

In the embodiment represented in FIG. 1, the connection column 3 communicates with the water heater 20 by the intermediary of a piece 3c having a bent form. Connection column 3 is also constituted by a vertical part preferably containing the non-return valve 4. The substantially horizontal portion of the bent form 3c comes to be fixed on an extremity of the water heater 20 in a manner permitting the transfer of the water contained in reservoir 1 and in connection column 3 towards said water heater 20. Connection column 3 presents a height h preferably comprised between 90 and 120 millimeters. Such a height h permits a sufficient force to be given to the water contained in the connection column 3 to penetrate into the water heater 20 when the non-return valve 4 is opened. Operation noises, as well as the steam produced are thus reduced when reservoir 1 is almost empty. Height h is advantageously defined by the distance taken vertically and separating a horizontal line drawn from bottom 1a of reservoir 1 and an axis x-x' defined by water heater 20. The distance defined by height h is localized at the inlet of water heater 20.

Figure 2:
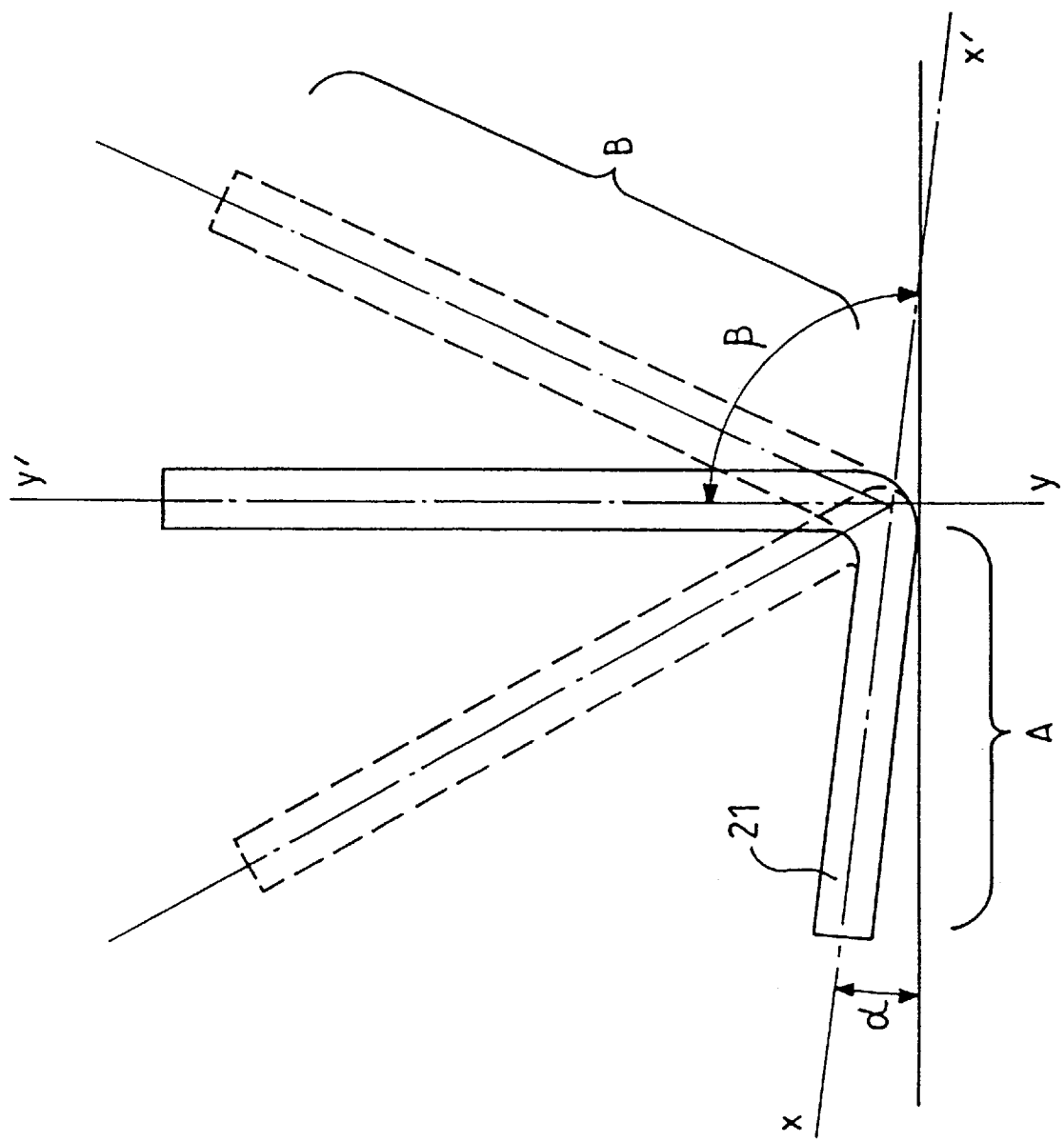
FIG. 2 represents a cross-section of a part of the heating unit according to the invention.

Connection column 3 is for example, constituted of a silicone hose. Water heater 20 is constituted by a circulation pipe 21 in thermal communication with a heating element 22 to permit the transfer of water contained in reservoir 1 through said circulation pipe 21 toward a distribution member 10. Water heater 20 represented in FIGS. 1 and 2 presents a configuration which can be described by the intermediary of a distinction made between a first part A and a second part B corresponding to said configuration. First part A and second part B extend in directions oriented angularly with respect to one another.

Second part B is rising in order to bring the water toward distribution member 10 and first part A extends between the rising second part B and connection column 3. First part A is also slightly inclined and rising in the direction opposite to the flow of water, i.e., toward connection column 3. First part A extends along axis x-x' presenting with respect to its orthogonal projection on a horizontal plane, an inclination equal to or greater than 4° and preferably comprised between 5° and 10°. An orthogonal projection on a horizontal plane is defined as a horizontal line. In addition, second part B presents an inclination with an angle β with respect to its orthogonal projection on a horizontal plane, for example, comprised between 45° and 135° and preferably comprised between 45° and 100°.

FIG. 2 advantageously represents a vertical extension plane defined by first part A and second part B, said extension plane having to be however considered in space. The extension plane defined by first part A and second part B is for example inclined with respect to an imaginary vertical plane containing a first part A, with an angle preferably comprised between 0° and 45°.

FIG. 2 represents the preferred inclinations of circulation pipe 21 of water heater 20. Thus, second part B extends along a vertical axis y-y' and first part A extends along an inclined axis x-x' at an angle with respect to its horizontal line. Angle a is greater than or equal to 4° and preferably between 5° and 10°.

According to one embodiment of the heating unit according to the invention, second part B extends along an axis y-y' presenting an inclination with respect to its horizontal line comprised between 45° and 135° and preferably comprised between 45° and 100°. It is obvious that heating element 22 presents the same configuration as circulation pipe 21 in a manner to be in intimate thermal communication along the entirety of its length with said circulation pipe 21. Extremities 22a and 22b of heating element 21 advantageously present an inclination which departs from circulation pipe 21 in order to facilitate the attachment of the electrical connections which are not shown in the figure.

Figure 3:
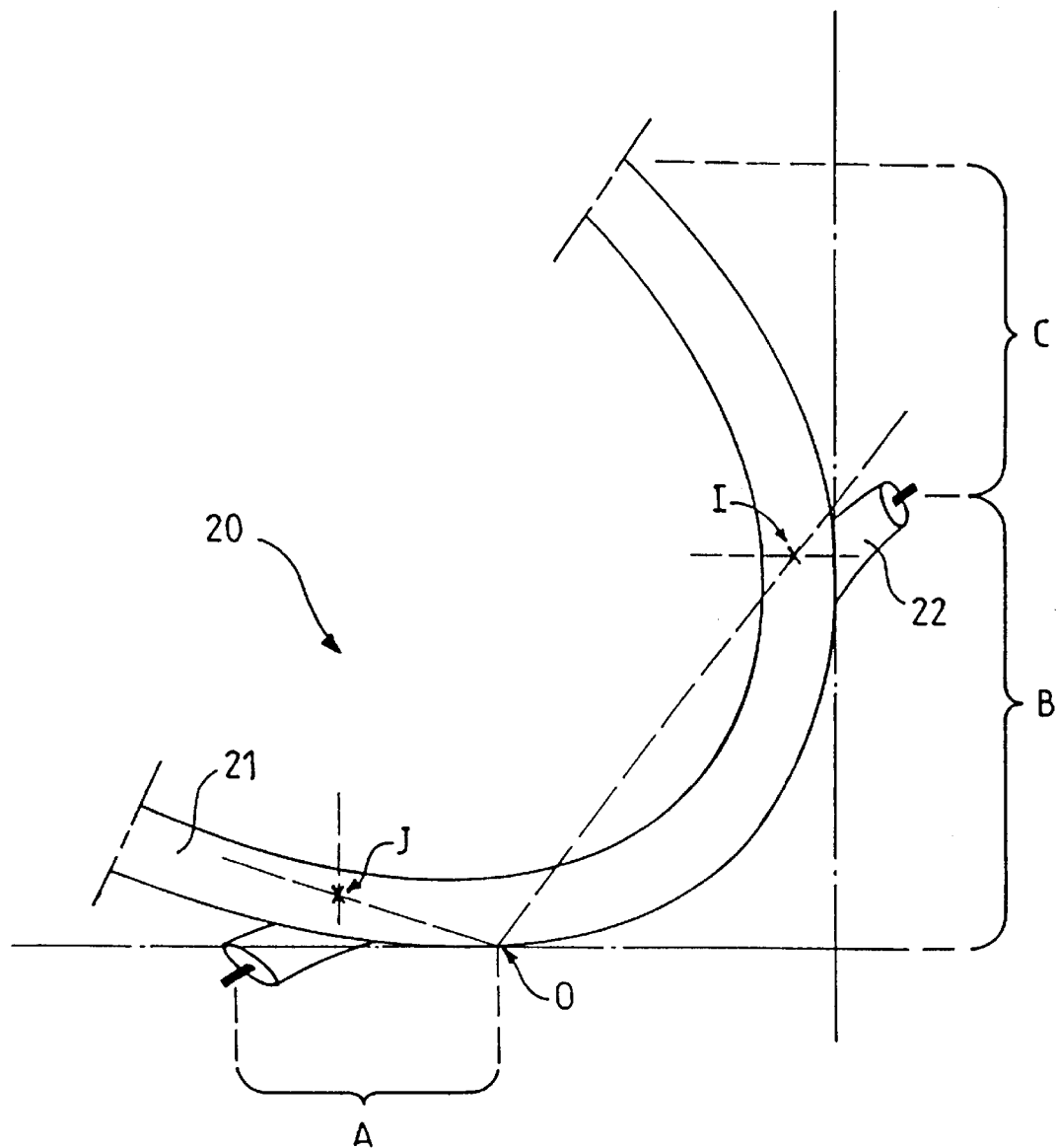
FIG. 3 represents a construction variation of the heating unit according to the invention.

According to another mode of construction of the heating unit according to the present invention and shown in FIG. 3, at least one of parts A and B has a curved form defined by at least one radius of curvature. The heating unit can also comprise straight line segments and curved segments in combination to take up a space adapted to the appliance on which the heating unit is mounted. Advantageously, imaginary straight line portions can be defined to satisfy the preferential inclinations according to the present invention. Thus, a point O is defined at the tangent point of circulation pipe 21 with respect to a horizontal plane. Points I and J are defined by the center of a transverse section of circulation pipe 21 located at levels corresponding to the extremities of heating element 22, said extremities being in direct thermal contact with circulation pipe 21.

Imaginary segments OJ and OI are thus assimilated respectively to first part A and second part B.

Water heater 20 is constituted by two metallic tubes in thermal communication, one of which constitutes circulation pipe 21 utilized for the circulation of water, the other metallic tube serving as a housing for heating element 22.

According to another form of construction of the heating unit according to the invention, heating element 22 can be fixed or secured to circulation pipe 21 by any known means and particularly by soldering.

Advantageously, circulation pipe 21 extends along axis x-x' beyond the extremity of heating element 22 in order to realize a portion of circulation pipe 21 heated by thermal conduction. Circulation pipe 21 thus comprises, beyond second part B, a length portion C heated solely by thermal conduction by second part B. Heating element 22 is preferably constituted by a sheathed heating element. This latter, in thermal relation with circulation pipe 21 presents a uniform thermal yield along the entirety of its length. Non-return valve 4 known per se is constituted for example of a spherical ball 4c moveable in translation between two stops 4a and 4b against which it comes to a block. When spherical ball 4c is in its upper position against stop 4a, a flow of water in connection column 3 toward water heater 20 is interrupted and when spherical ball 4c is in its lower position against stop 4b, a flow of water is permitted by a specific and known configuration of said stop 4b. Circulation pipe 21 also comprises at its extremity a connection member 24 permitting transfer of water from water heater 20 toward distribution member 10. Connection member 24 advantageously has the same internal diameter as circulation pipe 21 and connection column 3.

Heating element 22 is in thermal communication with circulation pipe 21 in first part A on a proportion of the length of heating element 22 which is less than the proportion of the length of heating element 22 in thermal communication with circulation pipe 21 in second part B. The distribution of thermal transfer between heating element 22 and circulation pipe 21 corresponds to values comprised between 35% and 45% in first part A and values comprised between 55% and 65% in second part B.

Advantageously, the distribution of thermal transfer between heating element 22 and circulation pipe 21 corresponds respectively to 40% and 60% in first part A and second part B. Such a thermal distribution particularly permits water expelled from water heater 20 to achieve a temperature of 90° C. during all of the phase of production of hot water.

According to another form of construction of the heating unit according to the invention, the distribution of thermal transfer between heating element 22 and circulation pipe 21 corresponds in first part A to a value comprised between 20% and 30% of the total thermal transfer. Water heater 20 is in this form of construction according to the invention and composed of four zones, of which the first pseudo-horizontal corresponds to first part A and the second corresponds to a bent part forming the connection between first part A and the second part B. This later, rising, corresponds then to the third zone. The width portion C, heated uniquely by conduction, can advantageously be assimilated to a forth zone of water heater 20. The thermal transfer existing in the second and the third zone thus defined correspond substantially to a range of 70% to 80% of the total thermal transfer. The distribution of this thermal transfer between the second zone and the third zone is not of importance.

The heating unit according to the invention also comprises a thermostat 30 for thermal regulation of which a fixation and thermal transfer foot is arranged on water heater 20 preferably in an interface zone between first part A and second part B. In addition, the heating zone corresponding to second part B extends to a horizontal level corresponding to the level defined approximately by bottom 1a of reservoir 1. Thus, all of the water contained in water heater 20, and the length portion C are heated, as soon as heating element 22 is supplied. Only a possible small quantity of water, found in connection number 20 before start of operation of the heating unit has a weaker heating, when the material constituting connection member 24 is not a thermal conductor.

Distribution member 10 into which empties connection member 24 presents at least two expulsion paths one of which in intended for hot water and the other of which for steam. The heating unit thus comprises means permitting it to produce and distribute hot water or vapor due to a control member 13 operated by the user. Thus, distribution member 10 comprises a first orifice 11 allowing escape of hot water by gravity and a second orifice 12 presenting a stricture 12a permitting production of steam starting from the water contained in circulation pipe 21. Distribution member 10 is also constituted by control member 13 permitting connection member 24 to be placed in communication with first orifice 11 or second orifice 12.

According to an example of a form of construction of the heating unit according to the invention, control member 13 is constituted by a shank 13a for example metallic displaceable by translation in a cylindrical body 14. Rigid shank 13a also comprises two discs 13b and 13c spaced apart and extending in extension planes perpendicular to said rigid shank 13a in a manner to create a piston displaceable by translation in cylindrical body 14. Discs 13c and 13b have a diameter substantially similar to the internal diameter of cylindrical body 14. Discs 13c and 13b equally present around all of their periphery a housing for a sealing joint 15 permitting the different compartments thus created in cylindrical body 14 to be rendered fluid tight. FIG. 1 shows for example, control member 13 in a position adapted to allow hot water to escape by gravity through first orifice 11. The dotted lines represent discs 13c and 13b when control member 13 in a position adapted to place connection member 24 in communication with second orifice 12 through a compartment defined between discs 13b and 13c in hollow body 14. This latter position corresponds to a regulation of control member 13 to produce steam starting from water contained in water heater 20. Cylindrical body 14 equally comprises a safety valve 16 when one utilizes the heating unit according to the invention to produce steam. Safety valve 16 is advantageously arranged on the part of cylindrical body 14 in which steam pressure is established.

The heating unit according to the invention also comprises clamping collars 3a, 3b, 5a, 21a and 24a in the assembly zones of the different tubular elements constituting a conduit for leading water from reservoir 1 and if need be steam from water heater 20 toward distribution member 10. Fluid tightness and pressure resistance are thus assured. The assembly and the tightening of said clamping collars 3a, 3b, 5a, 21a and 24a on the tubular elements are carried out by any known means. Clamping collar 3b is utilized to prevent non-return valve 4 from being displaced in connection column 3.

According to another form of construction of the heating unit according to the invention, distribution member 10 is constituted by a gate comprising at least 3 paths, susceptible to place circulation pipe 21 in communication either with first orifice 11 or with second orifice 12. Such a gate is constituted for example by ceramic discs provided with different orifices capable of coming in line with one another to place in communication different paths of circulation of hot water or of steam. According to a form of construction of the heating unit according to the invention, the dimensions of first part A and the second part B are respectively 75 millimeters and 100 millimeters. The power of heating element 22 is comprised between 500 and 1,200 watts. For the production of hot water, the power is comprised preferably between 1,000 and 1,200 watts and for the production of steam, the power is comprised preferably between 500 and 600 watts.

The heating unit according to the invention thus permits obtaining a preferential operation either during the production of hot water or during the production of steam. Before placing the heating unit into operation, i.e., before supplying electricity to heating element 22, part of the water contained in reservoir 1 flows past non-return valve 4 under the effect of its weight and flows into water heater 20. The level of water obtained in second part B or in length portion C or in connection member 24 is determined by the principal of communicating vessels. Thus, the fact of constructing water heater 20 with heating element 22 of which extremity 22b extends up to a level in the vicinity of bottom 1a on the one hand, and with a length portion C heated by thermal conduction permits a reduction and even a suppression of the existence of a quantity of cold water expelled by distribution member 10 at the start of operation of the heating unit. When heating element 22 is supplied with an electric current it produces a first heating and thus a slight evaporation in first part A with bubbles of steam being displaced in the direction of non-return valve 4. There is thus established in the zone situated below non-return valve 4 a pressure causing ball 4c to move upwardly into abutment against stop 4a in a manner to block the water passage and prevent the arrival of a supplemental quantity of water into water heater 20. Thermal dissipation by heating element 22 then contributes to a more and more substantial heating of the water contained in second part B as well as in first part A to create a sufficient pressure which permits the water to be caused to rise toward connection member 24 and to be evacuated by first orifice 11 of distribution member 10. First orifice 11 presents for this purpose a dimension or diameter greater than the internal diameter of circulation pipe 21. Second part B i.e., the rising portion of water heater 20, permits creation of a sufficient pressure in aiding the appearance of vapor bubbles having a larger volume and a higher temperature. When a part of the water contained in a portion of part B in water heater 20 is evacuated via first orifice 11, there is created a slight pressure drop in water heater 20 and above all at the level of non-return valve 4. Ball 4c is drawn toward the bottom against stop 4b in a manner to permit a small quantity of water from reservoir one to reach water heater 20.

The same phenomenon is reproduced in small cycles and with small quantities of water until reservoir 1 empties. Aspiration of a small quantity of water during each cycle corresponding to expulsion of another quantity of water from water heater 20 permits avoidance of an expulsion of cold or tepid water from water heater 20 after the first operating cycle. The water thus aspirated or admitted into water heater 20 after the first operation cycle is found mixed with already hot water contained in said water heater 20. Thus, no water having an insufficient temperature is distributed by the heating unit during operation. The inclination of metallic tube 21 in first part A permits a displacement in the direction of non-return valve 4 of vapor bubbles produced in this same first part A to block the arrival of water and aid the expulsion of water from water heater 20.

When the user decides to produce steam he selects with the aid of the control member 13 the steam position which corresponds to the blocking of first orifice 11 and the placing of connection number member 24 in communication with second orifice 12 of distribution member 10. Second orifice 12 is connected to a stricture 12a presenting for example an expulsion diameter of 1.4 millimeters. The diameter of stricture 12a is thus obviously a function of the power with which steam is produced. Stricture 12a is an obstacle braking the expulsion of water contained in water heater 20. This obstacle to flow leads to a longer duration of presence of water in water heater 20 and thus provokes a more substantial heating of said water. This latter provokes a more substantial vaporization and consequently a production of steam. This production of steam increases the pressure at the interior of water heater 20 in a manner to block by the intermediary of non-return valve 4 the arrival of new quantities of cold water from reservoir 1. The blocking of connection column 3 continues until nearly complete evaporation of the water contained in water heater 20. The pressure existing at the interior of water heater 20 permits complete evacuation of water in the vapor phase and provokes as a result a displacement of ball 4c in order to aspirate by pressure drop a quantity of water filling first part A and at least partially second part B of circulation pipe 21 of water heater 20. The water evacuated completely from circulation pipe 21 also provokes a pressure drop aspirating a new quantity of water. Such a cycle can be reproduced as long as there is water available in reservoir 1.

Connection column 3 presents in this example a bent form 3c substantially inclined along axis x-x' with a length adapted to the vaporization cycles. In effect, the more substantial the bent form 3c coming to be fixed on circulation pipe 21, the greater will be the quantity admitted into said circulation pipe 21. The quantity of steam produced is increased as a result. The duration of each vaporization cycle depends equally on the power of heating element 22.

The heating unit according to another form of construction according to the present invention is associated with a pump permitting the pressure of the fluid to be increased. The pump is advantageously situated downstream of water heater 20 to increase the pressure of the distributed water. The pump, not shown in the figures or an additional pumping device is particularly advantageous for the preparation of espresso coffee. According to another form of construction according to the present invention, the heating unit is arranged in a steam jet cleaning device or in a steam generator for a pressing iron.

The advantage of the heating unit according to the invention resides in its extreme simplicity as well as in its utilization permitting the production of either hot water or steam. It is thus no longer indispensable to utilize a specific water heater or anther device to produce steam. The steam can be produced as long as there is water in reservoir 1, possibly in alternation with production and distribution of hot water.

Another advantage to the heating unit according to the invention resides in the particular configuration of the water heater 20 permitting a first evaporation phase in first part A not resulting in a first expulsion of hot water which has not achieved a sufficient temperature. The first vapor bubbles being displaced toward non-return valve 4, in this first permitting to contain all of the water contained in the water heater 20, in thermal exchange with heating element 22 in a manner to expel said water only when it will have achieved a temperature greater than 90° C. A possible distribution of water not having achieved a required temperature can only involve a small volume of water on the one hand, and can only concern the first water expulsion cycle on the other hand. The portion of circulation pipe extending beyond the extremity of heating element 22 of second part B equally prevents a premature cooling of water expelled from said water heater.

A supplementary advantage of the heating unit according to the invention resides in the production of hot water at a temperature greater than 90° thus permitting in an application relative to a coffee maker obtaining a finished beverage, such as coffee at a higher temperature. Such an improvement in temperature easily permits the user to mix his beverage with milk or another liquid at ambient temperature. Extraction is found to be optimized by the same occasion with a temperature superior to 90° C., with very small operating noises and vapor phases.

A complementary advantage of the heating unit according to the invention is the utilization of a single thermostat 30 for the hot water phase and the steam phase. Utilization of the thermostat 30 permits cutting of the supply of the heating element 22 when the temperature of the water heater rises above a certain threshold. This latter is achieved in general when all of the water contained in circulation pipe 21 and in reservoir 1 is evaporated. Deteriorations associated with overheating are thus avoided, and in particular at the location of the connections with plastic or silicones elements, such as hoses for example.

The length portion C, which is not directly in contact with heating element 22, constitutes in addition a thermal brake or buffer with respect to connection member 24, made for example, of silicone.

Moreover, the production of steam and the admission of cold water in alternation permits obtaining thermal shocks in water heater 20. Such phenomena are found to be particularly advantageous to loosen or break up layers of scale deposited at the interior of circulation pipe 21.

Possibilities of Industrial Application

The present invention finds its application in particular in appliances for preparation of hot beverages, of the electric coffee maker type.

What is claimed is:

1. Heating unit for household appliance constituted by a water circulation pipe (21) in thermal communication with a heating element (22) permitting the transfer of water contained in a reservoir (1) toward a distribution member (10), through, respectively, a connection column (3) disposed below the reservoir (1) and the circulation pipe (21) presenting a configuration in two parts (A, B) associated with a portion of the heating element (22), the second part rising to lead the water toward the distribution member (10), characterized in that the first part (A), oriented angularly with respect to the second part (B), extends between the connection column (3) furnished with a non-return valve (4) and said second part (B), in an inclined and descending manner in the direction of flow of water, and the distribution member (10) comprises a first orifice (11) allowing escape of hot water by gravity, and a second orifice (12) presenting a stricture (12a) permitting production of steam starting from water contained in the circulation pipe (21).

2. Heating unit according to claim 1 characterized in that the first part (A) extends along an axis (x-x') having an inclination with respect to its orthogonal projection on a horizontal plane, greater than or equal to 4°.

3. Heating unit according to claim 1 characterized in that the second part (B) extends along an axis (y-y') presenting an inclination with respect to its orthogonal projection on a horizontal plane, said inclination being comprised between 45° and 135°.

4. Heating unit according to claim 1 characterized in that at least one of the parts (A, B) presents a curved form defined by at least one radius of curvature.

5. Heating unit according to claim 1 characterized in that the heating element (22) provides a uniform thermal yield along all of its length.

6. Heating unit according to claim 1 characterized in that the heating element (22) is in thermal communication with the circulation pipe (21) in the first part (A) on a proportion of length of the heating element (22) less than the proportion of length of the heating element (22) in thermal communication with the circulation pipe (21) in the second part (B).

7. Heating unit according to claim 6 characterized in that the distribution of thermal transfer between the heating element (22) and the circulation pipe (21) corresponds to values comprised between 35% and 45% in the first part (A) and values comprised between 55% and 65% in the second part (B).

8. Heating unit according to claim 6 characterized in that the distribution of thermal transfer between the heating element (22) and the circulation pipe (21) corresponds, in the first part (A), to a value comprised between 20% and 30% of the total thermal transfer.

9. Heating unit according to claim 1 characterized in that it is constituted of two metallic tubes in thermal communication one of which constitutes the water circulation pipe (21), the other metallic tube forming a housing for the heating element (22).

10. Heating unit according to claim 1 characterized in that the distribution member (10) is constituted by a gate capable of placing the circulation pipe (21) in communication either with the first orifice (11) or with the second orifice (12).

11. Heating unit according to claim 1 characterized in that the circulation pipe (21) comprises beyond the second part (B) a length portion (C) heated solely by thermal conduction by the second part (B).

12. Heating unit according to claim 1 characterized in that it is mounted on a household appliance.

13. Electric coffee maker comprising a heating unit according to claim 1.

14. A heating unit according to claim 1 wherein said first part (A) is inclined downwardly, in the direction of flow of water, from said connection column (3).

15. A heating unit according to claim 14 wherein said first part (A) has an inlet end and an outlet end, and said water circulation pipe further includes a first curved portion connected between said connection column (3) and said inlet end of said first part (A) and a second curved portion connected between said outlet end of said first part (A) and said second part (B).

16. Heating unit according to claim 1 characterized in that the first part (A) extends along an axis (x-x') having an inclination, with respect to its orthogonal projection on a horizontal plane, between 5° and 10°.

17. Heating unit according to claim 1 characterized in that the second part (B) extends along an axis (y-y') having an inclination, with respect to its orthogonal projection on a horizontal plane, between 45° and 100°.

* * * * *